United States Patent
Romney

(10) Patent No.: US 8,045,231 B1
(45) Date of Patent: Oct. 25, 2011

(54) METHOD AND APPARATUS FOR PERFORMING DIGITAL IMAGE PROCESSING WITHOUT RASTERIZATION

(75) Inventor: Robert Romney, Irvine, CA (US)

(73) Assignee: Zenographics, Inc., Irvine, CA (US)

( * ) Notice: Subject to any disclaimer, the term of this patent is extended or adjusted under 35 U.S.C. 154(b) by 0 days.

(21) Appl. No.: 12/907,804

(22) Filed: Oct. 19, 2010

Related U.S. Application Data

(63) Continuation of application No. 11/139,313, filed on May 27, 2005, now Pat. No. 7,817,307.

(60) Provisional application No. 60/641,682, filed on Jan. 6, 2005.

(51) Int. Cl.
*G06K 15/00* (2006.01)
*H04N 1/40* (2006.01)
*G06F 15/00* (2006.01)

(52) U.S. Cl. .......................... 358/2.1; 358/1.18

(58) Field of Classification Search ............ 358/1.1, 358/1.9, 1.13, 1.14, 1.15, 1.18
See application file for complete search history.

(56) References Cited

U.S. PATENT DOCUMENTS

| | | | |
|---|---|---|---|
| 4,583,116 A | 4/1986 | Hennig et al. |
| 4,700,399 A | 10/1987 | Yoshida |
| 4,821,336 A | 4/1989 | Roye |
| 4,833,722 A | 5/1989 | Morton et al. |
| 5,113,249 A | 5/1992 | Yosefi |
| 5,131,058 A | 7/1992 | Ting et al. |
| 5,153,748 A | 10/1992 | Moyer |
| 5,204,918 A | 4/1993 | Hirosawa |
| 5,255,329 A | 10/1993 | Tanimizu et al. |
| 5,295,235 A | 3/1994 | Newman |
| 5,295,236 A | 3/1994 | Bjorge et al. |
| 5,313,570 A | 5/1994 | Dermer et al. |
| 5,386,483 A | 1/1995 | Shibazaki |
| 5,402,530 A | 3/1995 | Boenke et al. |
| 5,440,652 A | 8/1995 | Ting |
| 5,528,387 A | 6/1996 | Kelly et al. |
| 5,542,052 A | 7/1996 | Deutsch et al. |
| 5,581,667 A | 12/1996 | Bloomberg |
| 5,594,860 A | 1/1997 | Gauthier |
| 5,613,046 A | 3/1997 | Dermer |
| 5,625,703 A | 4/1997 | Okuda et al. |
| 5,634,089 A | 5/1997 | Kulbida et al. |
| 5,638,498 A | 6/1997 | Tyler et al. |
| 5,666,543 A | 9/1997 | Gartland |
| 5,668,931 A | 9/1997 | Dermer |
| 5,682,249 A | 10/1997 | Harrington et al. |
| 5,684,895 A | 11/1997 | Harrington |
| 5,687,303 A | 11/1997 | Motamed et al. |
| 5,699,102 A | 12/1997 | Ng et al. |
| 5,704,021 A | 12/1997 | Smith et al. |
| 5,727,090 A | 3/1998 | Yellin |
| 5,740,338 A | 4/1998 | Gauthier et al. |
| 5,754,750 A | 5/1998 | Butterfield et al. |

(Continued)

FOREIGN PATENT DOCUMENTS

EP 0531012 A2 3/1993

(Continued)

*Primary Examiner* — Douglas Tran

(57) ABSTRACT

A method including storing a plurality of segments. Each of the segments includes a first drawing command to render a scanline on a rendering device. The segments are non-overlapping. The method further includes receiving a page element. The page element includes a second drawing command to render a page on the rendering device. The page element includes a first segment. The method further includes merging the first segment into the plurality of segments. Merging the first segment into the plurality of segments includes selectively shrinking one of the plurality of segments.

20 Claims, 6 Drawing Sheets

U.S. PATENT DOCUMENTS

| | | | |
|---|---|---|---|
| 5,760,914 | A | 6/1998 | Gauthier |
| 5,796,930 | A | 8/1998 | Gauthier et al. |
| 5,805,174 | A | 9/1998 | Ramchandran |
| 5,835,640 | A | 11/1998 | Clements |
| 5,875,040 | A | 2/1999 | Matraszek et al. |
| 5,960,166 | A | 9/1999 | Brown et al. |
| 5,984,446 | A | 11/1999 | Silverbrook |
| 6,002,847 | A | 12/1999 | Silverbrook |
| 6,005,670 | A | 12/1999 | Coleman |
| 6,006,013 | A | 12/1999 | Rumph et al. |
| 6,014,133 | A | 1/2000 | Yamakado et al. |
| 6,046,818 | A | 4/2000 | Benson |
| 6,049,390 | A | 4/2000 | Notredame et al. |
| 6,081,608 | A | 6/2000 | Fujii et al. |
| 6,256,104 | B1 | 7/2001 | Rumph et al. |
| 6,280,105 | B1 | 8/2001 | Lida |
| 6,304,278 | B1 | 10/2001 | Coleman |
| 6,317,217 | B1 | 11/2001 | Toda |
| 6,327,043 | B1 | 12/2001 | Rumph et al. |
| 6,341,020 | B1 | 1/2002 | Rumph et al. |
| 6,429,948 | B1 | 8/2002 | Rumph et al. |
| 6,429,949 | B1 | 8/2002 | Dziesietnik et al. |
| 6,433,882 | B1 | 8/2002 | Mori et al. |
| 6,462,831 | B1 | 10/2002 | Akiyama |
| 6,476,931 | B1 | 11/2002 | Aizikowitz et al. |
| 6,529,633 | B1 | 3/2003 | Easwar et al. |
| 6,567,559 | B1 | 5/2003 | Easwar |
| 6,594,403 | B1 | 7/2003 | Bozdagi et al. |
| 6,621,586 | B1 | 9/2003 | Kumar et al. |
| 6,633,403 | B1 | 10/2003 | Nonaka |
| 6,647,151 | B1 | 11/2003 | Stallbaumer et al. |
| 6,665,081 | B1 | 12/2003 | Suzuki et al. |
| 6,671,064 | B2 | 12/2003 | Rumph et al. |
| 6,731,400 | B1 | 5/2004 | Ikeda |
| 6,767,072 | B1 | 7/2004 | Sato |
| 6,795,208 | B1 | 9/2004 | Tanaka |
| 2001/0022659 | A1 | 9/2001 | Arai |
| 2002/0027666 | A1 | 3/2002 | Ikeda |
| 2002/0054313 | A1 | 5/2002 | Shimizu |
| 2002/0131059 | A1 | 9/2002 | Tsuchitoi |
| 2002/0154324 | A1 | 10/2002 | Tay et al. |
| 2003/0107766 | A1 | 6/2003 | Ramot et al. |
| 2003/0117637 | A1 | 6/2003 | Coleman |
| 2003/0117643 | A1 | 6/2003 | Coleman |
| 2003/0117644 | A1 | 6/2003 | Coleman |
| 2003/0121007 | A1 | 6/2003 | Coleman |
| 2004/0032617 | A1 | 2/2004 | Lapstun et al. |
| 2004/0120006 | A1 | 6/2004 | Kumar et al. |
| 2004/0120593 | A1 | 6/2004 | Earl et al. |
| 2005/0219577 | A1 | 10/2005 | Edge |

FOREIGN PATENT DOCUMENTS

| | | |
|---|---|---|
| JP | 2001222396 | 8/2001 |
| JP | 2001270170 | 10/2001 |
| JP | 2001287413 | 10/2001 |
| WO | WO 9843204 | 10/1998 |
| WO | WO 9924933 | 5/1999 |
| WO | WO 0022568 | 4/2000 |

METHOD AND APPARATUS FOR PERFORMING DIGITAL IMAGE PROCESSING WITHOUT RASTERIZATION

CROSS-REFERENCE TO RELATED APPLICATIONS

This application is a continuation of U.S. application Ser. No. 11/139,313 filed May 27, 2005 (now U.S. Pat. No. 7,817, 307), which claims priority under 35 U.S.C. §119(e) to U.S. Provisional Application No. 60/641,682 filed Jan. 6, 2005. The disclosures of the applications referenced above are incorporated herein by reference.

FIELD

This invention relates generally to methods and systems for rendering computer-generated page descriptions into raster pixel arrays for use in digital output systems such as printers.

BACKGROUND

Output systems for digital images include computer displays ("monitors") and printers. Users of computer software such as word processors, drawing programs, and spreadsheets create documents that place text, graphics, and bitmaps (e.g. photographs) on one or more pages of a document. Other sources of digital page descriptions are the World Wide Web (notably HTML pages), and computer software (e.g. database systems generate reports, 3D software creates polygon meshes of artificial scenes, etc.). When such a digital page must be output to a monitor or printer, software is invoked to describe precisely the location and attributes for each page element. All of the page elements combined form the page description. Each page element, with an arbitrary position, color, and size, is specified sequentially. This implies that a subsequent element may fully or partially overlap an earlier page element. The horizontal and vertical element positions are normally described in a two-dimensional coordinate system with the usual (X,Y), while the drawing order of the elements is often known as the Z order.

However, the simple horizontal scanning video circuits in computer monitors and print engine controllers accept only flat (2D), linear sequences of bits. These bits must show the parts of each page element that are finally visible on the line after any overlaps among elements are resolved. In the (X, Y, Z) scheme, this means that for each Y line on the page, the output video can accept only the bits along one line at a time. One or more bits constitute a picture element, or "pixel"; there is one pixel for each X position.

Because these video output circuits are so simple, the combination of a quite general page element (at the level of the generating software) such as a green-filled rectangle partially obscured by a red circle is far too complex to be handled in real time during actual display or output. The page elements must first be converted into the much simpler scanline raster structure described above, and any Z-order overlaps must be resolved prior to final output.

By far the most common solution to this problem is software known as a rasterizer, also known as a "RIP" (Raster Image Processor), which simply allocates a full page (the "frame buffer") of raster memory (or in a more limited case a strip or "band") and then draws ("rasterizes") each page element into the raster memory. A computer monitor typically displays in real time so the viewer sees the drawing of each element apparently instantaneously, but for a printer the full page description (all the page elements) must arrive before output can start. This is because even the very last page element might draw something on the first line, and once the printing process starts, it normally starts from the top down and cannot reverse. Ink or toner deposited on paper cannot be erased.

The process of rasterizing takes a page element and "scan converts" the element into the horizontal and vertical arrays of pixels that visually correspond to the element. For example, a green rectangle 50 lines high and 75 pixels across will put 3,750 (50×75) green pixels into the raster structure, 75 pixels on each of 50 lines, at the position in the raster corresponding to the page position of the element.

If a subsequent page element, say a red circle, appears and overlaps part or all of the green rectangle, because the red circle appears later (higher in the Z order) then the red pixels replace (typically) the green pixels exactly where the red circle overlaps the green rectangle.

The problem of resolving overlaps in a conventional rasterizer is solved by large amounts of computer RAM (in which each pixel is randomly and directly accessible) with direct memory overwrites of pixels that are obscured.

This scheme is entirely general and is well-suited to handling millions or even billions of page elements appearing in random positions. The amount of frame buffer RAM remains constant irrespective of the number of page elements.

Even in the case of poor programming in which an identical page element is mistakenly sent millions of times, there is no memory cost. Each element is drawn (possibly over previous ones) and then the element is discarded. There is only the cost of CPU time.

Once all the page elements have been rasterized, this now greatly simplified raster data is ready to be sent to the output device.

Even for medium resolution monitors (1024×768 is now common), modern computers use graphics "accelerator" chips to speed up this process of rasterization. When dealing with a printed page, however, current quality requirements demand at least 600×600 pixels per inch (also known as DPI or Dots Per Inch), which is 5,100×6,600 pixels for an 8.5"× 11" area on paper. For the best quality, rasterizers for printers process "continuous tone" or "contone" pixels, typically taken to mean 8 bits per primary color. For a CMYK (color) printer then, each pixel is 32 bits, or four 8-bit bytes. A full page raster for US Letter paper is 5100×6600×4=134,640, 000 bytes (approximately 128 MB).

Even by today's standards, this is a large amount of computer RAM, particularly on a computer with other concurrent processes and a large operating system (e.g., Microsoft Windows). And, if the quality required doubles in each of X and Y to 1200×1200 DPI, as with newer printers, then the RAM required for the frame buffer quadruples. A full frame buffer for US Letter paper for 32-bit CMYK contone at 1200×1200 DPI requires 538,560,000 bytes (over ½ gigabyte).

Modern CPUs are dramatically faster internally than the RAM can operate. The bridge between the very fast CPUs and the slow RAM are the CPU caches, known as L1 (fastest) and L2 (fast) for Level 1 and Level 2 caches. Access to slow RAM is through the much smaller caches. A Pentium 4 CPU for example typically has just 8 KB L1 and 256 KB L2 caches.

The link to the rasterizing problem is this: because the page elements can appear randomly, the rasterizer puts the elements' pixels into the RAM as it receives them, and there is potential for cache "thrashing". As page elements appear all over the page, a particular region of slow RAM might be brought in to the CPU cache repeatedly during the page rasterization, having been displaced repeatedly by different RAM regions. Conceivably the same slow RAM areas could be brought into the cache thousands of times per page. Because of the cache architectures (with cache lines), modern CPUs access memory more efficiently using sequential access compared to random access.

So, one big performance problem with conventional rasterizers is that they consume too much slow RAM.

But this problem is just the beginning. The bulk of the frame buffer causes further big problems "downstream" since this huge amount of raster data must be both processed and then delivered eventually to the simple print engine video circuits.

The second big problem, derived from the first, is that in high-quality print systems further image-processing steps are required (color matching, trapping, halftoning, etc.). In typical simple systems, these post-rasterization operations are applied to each pixel in the raster. If some of these operations are neighborhood operations (which examine and adjust each pixel in the context of its immediate neighbors), the CPU cost can be enormous: many times longer than the rasterization process itself.

A third big problem then arises from the bulky "raw" raster. The print engine circuits may be in a device separate from the raster frame buffer. This print architecture is known as "raster" or "host-based", or incorrectly as "GDI" (taken from Microsoft Windows Graphical Device Interface), where the user (or client) PC performs the rasterizing and hosts the raster frame buffer.

A raster printer connected to a PC via USBI can accept at best about 1 million bytes per second. Taking our 1200× 1200×32 Letter example where the raster frame buffer is over 500 million bytes, that single page would take over 500 seconds just to transmit (over 8 minutes). The 600×600×32 Letter page would take over 2 minutes to transfer. (Printers connected via Ethernet have widely varying bandwidth, but sometimes perform even worse than USB.) And, a laser printer would need an equivalent and expensive amount of RAM to store the entire frame buffer since once the laser engine starts it cannot stop, and any delay in the arrival of the data after engine start would mean an incomplete print.

Since the printer's manufacturer would be unable to sell such a slow and expensive printer, the conventional solution to this problem is compression of the raster. Once the final raster is complete, a post-rasterizing compression step is applied to reduce the number of bytes that must be transmitted.

But, as is well known in the art, there is a fundamental trade-off with compression methods: the greater the compression, the greater the CPU time cost. So, with these very large raster frame buffers, to effectively compress the data often takes more CPU time than to rasterize in the first place.

Further straining this bloated, inefficient, slow system is an optional quality requirement that each page element be handled differently by class of element. For example, a different halftone screen might be applied to text as compared to the screen for bitmaps (photos).

This implies, for the conventional rasterizer, that even more RAM must be allocated per pixel. The page element type (text, graphics, image, etc.) must be recorded in the frame buffer as well as the color information. The CMYK contone system described earlier would need to expand typically by at least another byte per pixel: 5 bytes per pixel. Another problem immediately presents itself: this odd number is awkward for modern computers. Filling and changing 5 bytes (40 bits) is a mismatch for 32-bit computers. So, the extra page element information (also known as "metadata" or "tag" bits) is typically allocated alongside the RAM in a parallel array of bytes. Now each logical row in the page has two RAM arrays: one of 32-bit CMYK pixels, and another of 8-bit metadata bytes. These two separate arrays now are even more likely to "thrash" the cache.

A final, fatal blow to the conventional rasterizer is an even higher quality requirement on color pixel precision. Microsoft has announced 128-bit per pixel color for its next major Windows release (code-named "Longhorn"). If the rasterizer must handle 128-bit pixels for optimum quality (i.e., no loss from the digital source), then the amount of RAM required is quadrupled again. In our 1200×1200 DPI case, the raw raster frame buffer for US Letter at 128-bits/pixel is over two billion bytes.

In the prior art, there are numerous attempts to alleviate the bulk and slowness inherent in simple rasterizers. None solve the original problem without introducing new major problems.

The main ideas in the prior art to reduce the RAM requirement involve either "banding" or "display lists", or both.

In the "banding" case, instead of allocating the entire frame buffer, typically a strip or band is allocated. If the page is 6000 lines, then a 600 line band would mean only 1/10 the RAM. What's wrong with this? There are two main drawbacks. First, the entire set of page elements must be recorded (into a "display list") to play back (rasterize) for each band on the page. Since the band buffer is now a mere fraction of the full page description, the display list must be complete. Second, elements that span more than one band must be processed more than once.

The display list problem is small for simple pages. A system making the display list for the text on this page wouldn't need much storage for the list. But for complex pages, the display list storage problem is crippling or fatal. A computer program generating polygons for an artificial scene might generate billions of polygons. All of these must be recorded in the display list before the banding rasterizer can begin. While this is an extreme case, every display list/banding scheme must handle the case where it runs out of resources (RAM, disk space, etc.) in which to record the display list. Upon overflow, some of the prior art attempts to "fallback" to raw raster at a lower quality, but the fundamental problem remains: there will be pages that either outright fail to print, or at least fail to print at the normal quality level.

The second performance problem with banding, though less severe, may still impair performance dramatically. Page elements that span multiple bands must be accessed and processed for each band in which they appear. The simplest method is to draw each element, repeatedly and fully, for each band, discarding any lines which are above or below the current banding buffer. Generating then discarding that raster data wastes CPU time. While it is sometimes possible to "clip" the element cleanly at band boundaries, often this is not entirely precise and is inefficient again due to wasted results.

A third method well known in the prior art is the use of sorted "active" object lists with the banding buffer as little as one line. While this can cut down on redundant pixel drawing, it retains the problem of display list overflow, and adds the problem of object sorting.

A fourth method involves a display list that creates per line a sorted list of active runs which are then "flattened" prior to output. This method retains the display list overflow problem, and adds the problem of potentially huge active object and active runs lists.

Accordingly, there is a need in the art for a system and method to produce the raster needed for output displays and print engines without either allocating huge amounts of slow RAM, or creating potentially huge slow display lists.

SUMMARY

In an embodiment, a raster image processing system and method accepts a digital page description as a series of page elements (text, graphics, images, etc.) and creates output video-ready ("flattened") raster without allocating large amounts of raster memory (arrays of pixels) and without creating a display list of all page elements. This technique dramatically improves performance (greater speed with fewer resources consumed) in the typical output process: rendering, image processing, compression, and transmission. The method records each page element in memory in a manner that largely retains the inherent compression of the element description, and fully retains the positional relationships with its neighboring elements. Where an incoming page element overlaps an existing one, the intersections are calculated on the fly, and elements underneath are split, merged, shrunken, or deleted. Each incoming page element is processed and recorded as described above, and then discarded. The result is a simple, non-overlapping ("flat") representation of the final output raster. In other words, in one embodiment, the representation starts empty, then stays compressed and flat throughout while accumulating representations of page elements.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein. In addition, the following definitions provide a general background pertaining to a variety of different embodiments of the invention, and are provided by way of example and are not intended to be limiting.

GLOSSARY

Cell: The term "cell" as used herein is a broad term and is used in its ordinary sense and includes, without limitation, a data structure representing a variable-width area within a Scanline or Region; in order to speed Segment insertion, the array of cells can be randomly-addressed by X position to find the leftmost or rightmost Segment in the cell.

Current Segment: The term "current segment" as used herein is a broad term and is used in its ordinary sense and includes, without limitation, a Segment from a Page Element already merged that currently intersects the Incoming Segment.

DPI: The term "DPI" as used herein is a broad term and is used in its ordinary sense and includes, without limitation, dots per inch.

Flattened: The term "flattened" as used herein is a broad term and is used in its ordinary sense and includes, without limitation, non-overlapping Segments or Regions; 2D (X and Y; no Z).

Glyph: The term "glyph" as used herein is a broad term and is used in its ordinary sense and includes, without limitation, a bitmap representation of a single letter in a font at a specific size.

Granularity: The term "granularity" as used herein is a broad term and is used in its ordinary sense and includes, without limitation, the maximum number of cells per scanline.

Incoming Segment: The term "incoming segment" as used herein is a broad term and is used in its ordinary sense and includes, without limitation, a Segment from the newest Page Element received from the Page Description.

Inherent Compression: The term "inherent compression" as used herein is a broad term and is used in its ordinary sense and includes, without limitation, the reduction in data storage inherent in the abstract but precise description of a Page Element, as compared to raw pixel arrays. For example, a filled polygon specified by its vertices has inherent compression since only the polygon boundaries are needed to precisely describe the raster areas covered; its inner fill areas are implied since they are filled edge-to-edge.

Macro: The term "macro" as used herein is a broad term and is used in its ordinary sense and includes, without limitation, saved output stream fragments with a unique identifier (UID), ready to be replayed in full by invoking the UID.

Object (type/class): The term "object" as used herein is a broad term and is used in its ordinary sense and includes, without limitation, a Page Element type, such as text, graphics, or image.

Opacity: The term "opacity" as used herein is a broad term and is used in its ordinary sense and includes, without limitation, the degree of transparency in the incoming Page Element. Full opacity is of course an opaque element; zero opacity is fully transparent such that the element is invisible; other opacity levels blend the source and destination pixels by the opacity percentage of the incoming Page Element.

Opaque: The term "opaque" as used herein is a broad term and is used in its ordinary sense and includes, without limitation, a common drawing mode in which source pixels in the page element overwrite destination pixels.

Palette: The term "palette" as used herein is a broad term and is used in its ordinary sense and includes, without limitation, a subset of colors used to save space in representing and processing common or repeated colors. For example, if addressed by a single 8-bit BYTE there is a maximum of 256 colors in the palette.

Page Description: The term "page description" as used herein is a broad term and is used in its ordinary sense and includes, without limitation, the list of Page Elements for an output page.

Page Element: The term "page element" as used herein is a broad term and is used in its ordinary sense and includes, without limitation, a precise drawing command to mark a page, typically comprising various text, graphics, and image commands.

Pattern: The term "pattern" as used herein is a broad term and is used in its ordinary sense and includes; without limitation, a pixel array intended to fill a Segment or tile a region by repetition.

Raster-op (rop): The term "raster-op" as used herein is a broad term and is used in its ordinary sense and includes, without limitation, the combination by logical operator (e.g., XOR, AND, NOT, etc.) of source (S), destination (D), and pattern (P) pixels. A binary rop combines S and D. A ternary rop combines S, D, and P.

Refinement: The term "refinement" as used herein is a broad term and is used in its ordinary sense and includes, without limitation, addition and adjustment of the Scanline's Cells if the number of Segments per Cell overflows, up to the Granularity limit.

Region: The term "region" as used herein is a broad term and is used in its ordinary sense and includes, without limitation, a two-dimensional raster area with an arbitrary boundary, often described by an array of vertically-contiguous rectangles and/or Segments.

Scanline: The term "scanline" as used herein is a broad term and is used in its ordinary sense and includes, without limitation, an array of device pixels corresponding to a full row in the output page or display.

Segment: The term "segment" as used herein is a broad term and is used in its ordinary sense and includes, without limitation, an abstract but precise drawing command for a single Scanline; can be of several types derived from the originating Page Element.

Translation: The term "translation" as used herein is a broad term and is used in its ordinary sense and includes, without limitation, the direct conversion from one abstract page description to another differing page description with little or no loss of Inherent Compression; as contrasted with the expansion of the first representation to raw pixel arrays, and the compression of those arrays into the second representation.

Traversal: The term "traversal" as used herein is a broad term and is used in its ordinary sense and includes, without limitation, moving through a linked list. For example, a right-threaded list (with each node carrying a pointer to its immediate right neighbor) allows one to start at the leftmost node, and traverse sequentially rightward.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements.

The current embodiment is described in reference to the drawings, in which.

DETAILED DESCRIPTION

Figure 1:
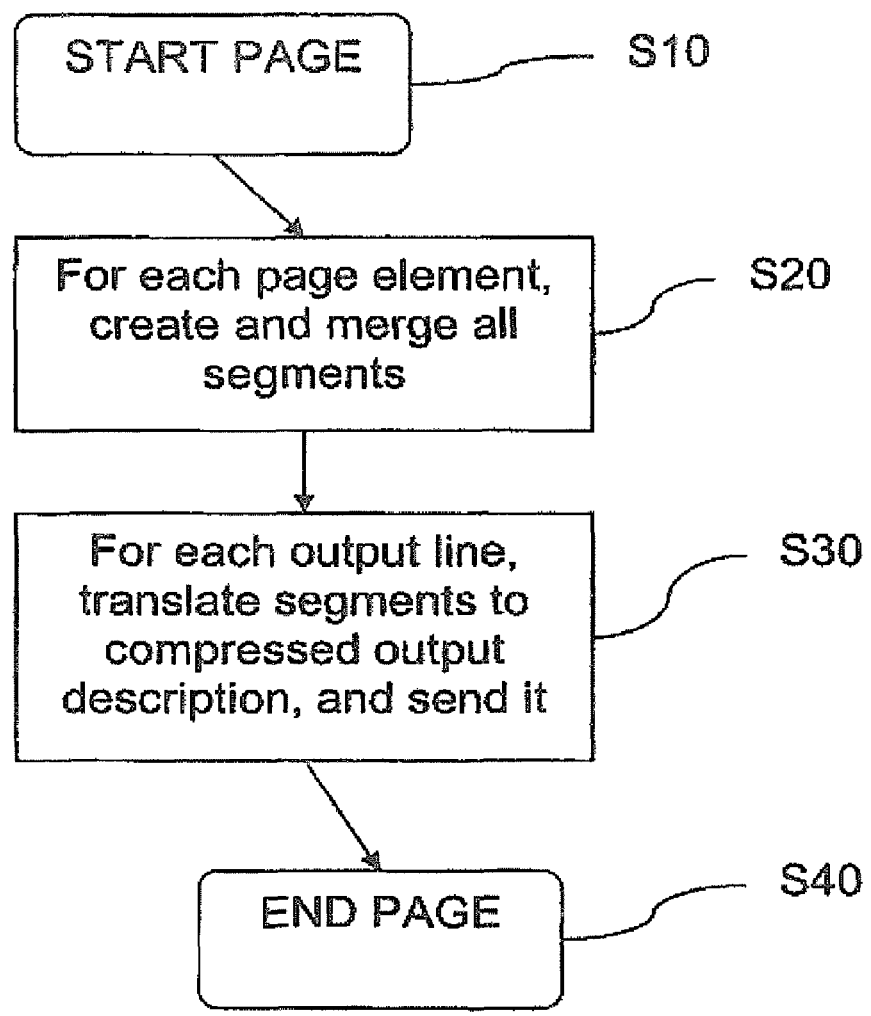
FIG. 1 shows a flowchart for the overall page processing method, according to an embodiment of the invention.

Certain embodiments of this invention flatten incoming page elements while largely retaining their inherent compression. The following table explains the concept of inherent compression for each page element class.

| Page Element Class | Specification | Inherent Compression | Example |
| --- | --- | --- | --- |
| Text | Specified as an array of [(x, y), position, glyph ID] | Unique characters per font/size are stored run-length compressed in a document glyph cache. | "This is a test" has 7 unique letters ("T", "h", "i", "s", "a", "t", "e") with each glyph run-length compressed (18 pt yields 3:1or better). |
| Graphics | Specified as object type (rectangle, line, polygon, etc.) with two or more (x, y) vertices. | The array of vertices consumes just 2 integers per vertex (8 bytes each on a 32-bit CPU). | A rectangle with corners at (100, 100) and (500, 500) is specified with just two vertices, compared to a raster area of 400 × 400 = 160,000 pixels. |
| Images | Specified as a source image, and a destination rectangle. | For printing, typically the source image is lower-resolution than the destination printer page area, often resulting in significant stretching of the source image both horizontally and vertically. | A 3" × 4" photo from a web page arrives with 96 dpi source pixels. The source pixel area is 3 × 4 × 96 × 96 = 110,592; the destination pixel area of 3 × 4 × 600 × 600 = 4,320,000 is more than 39 times larger. |
| Patterns (Page Element fill attribute) | A page element can be pattern-filled instead of solid-filled. The pattern is specified as a bitmap. | The pattern bitmap is tiled repeatedly across the entire raster area to be filled, an area which is typically much larger than the pattern bitmap. | For the 400 × 400 pixel rectangle described above, a cross-hatch pattern of 8 × 8 pixels takes just 64 pixels to specify, compared to the full raster area of 160,000 pixels. |

As described above and shown in FIG. 1, a high-level view of a page processing method is shown. For a given page (S 10), the method first receives and processes the page elements (S20), then second, translates the results into a form suitable for the output target (S30). In a printing system, at end of page (S40), another page may be accepted and processed.

Figure 2:
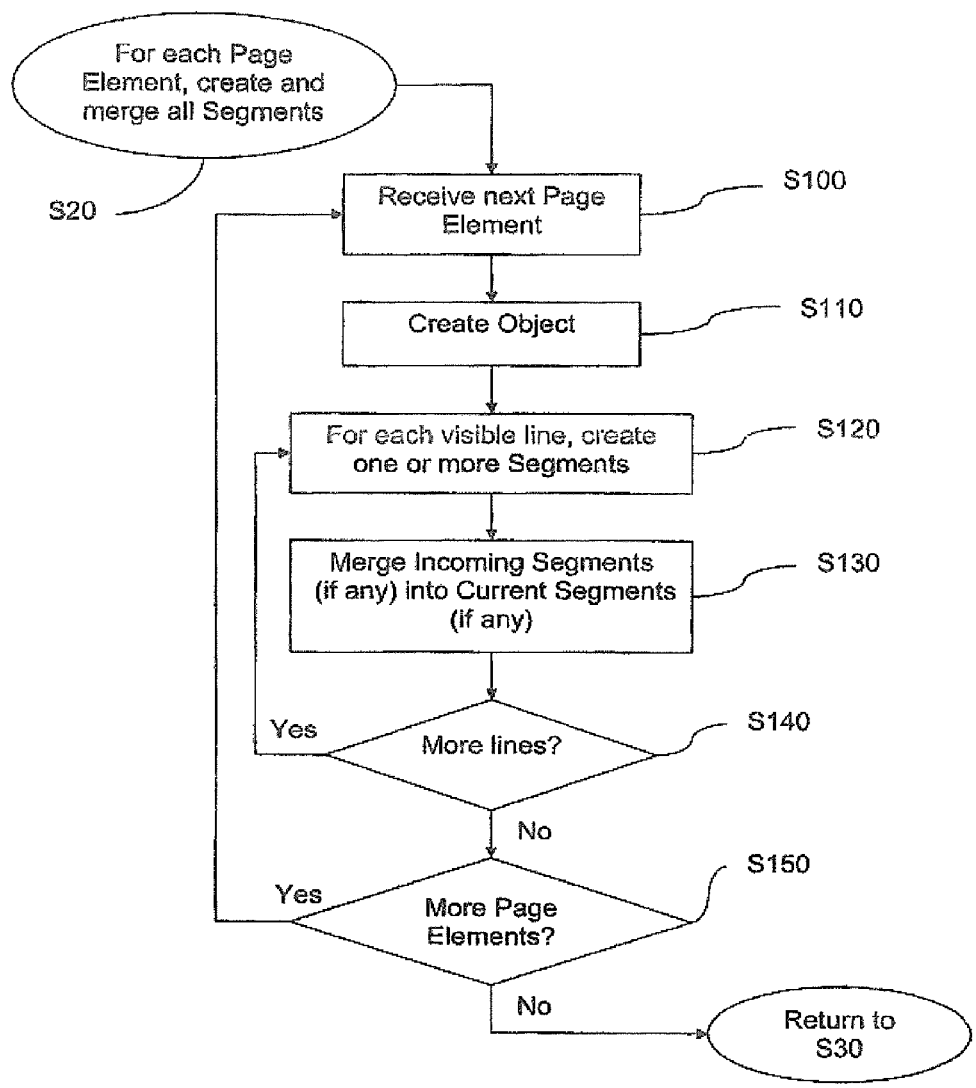
FIG. 2 shows a flowchart for processing each page element, according to an embodiment of the invention.

FIG. 2 breaks down the process of step 820 in more detail. A page comprises zero or more page elements, which are composed and sent from a higher-level process. At start of page, the current embodiment method starts with almost nothing. Unlike a conventional raster system which typically allocates and clears a full frame buffer before the first page element arrives, one embodiment of the invention allocates only an array of row pointers, one per row in the page, all of which are NULL (empty).

When a page element is received (S 100), an Object is created in memory (S110) to capture its attributes: color, pattern, object class, and anything else unrelated to the position and size.

The page element spans one or more lines. For each visible line (S 120), the page element intersects the line in zero or more locations. These horizontal pairs of intersections are called Segments. Often the segments arrive already sorted in ascending (left to right) horizontal (x) order; if not, the segments are sorted. Also, since the segments are derived from a single (flat) page element, it should be impossible that any segments overlap. Each segment is checked and corrected if any such overlaps exist.

If there are one or more Segments on the line, these Incoming Segments are then merged with Current Segments (if any) (S130). This process repeats until the lines in the Page Element are processed (S140). At step (S150), the method returns to (S100) to await more Page Elements.

Steps S110 and S120 create Object and Segment structures in memory. See TABLE 1 below for the Object structure members.

TABLE 1

Object Structure

| Object Member | Description |
| --- | --- |
| Type | Object type (plain, bitmap, . . . ) |
| ColorType | Page element class for color processing |
| Index | Palette index (if any) |
| Translated | Colors have been translated? (Boolean) |
| Color | Color (direct) |
| pPalette | Pointer to Palette (if any) |
| pObjectRight | Pointer to next Object |
| pPattern | Pointer to full pattern pixel array (rows and columns) |

If an incoming bitmap page element has a source resolution less than the destination resolution (requiring source pixels to be stretched to fit the destination area), then a special Bitmap Object is created so as to reduce, typically dramatically, the storage required. See TABLE 2 below for the additional Bitmap Object structure members.

TABLE 2

Bitmap Object Structure

| Bitmap Object Member | Description |
| --- | --- |
| Object | Inherits Object members |
| StretchInfo | Information for pfnStretch to stretch source bitmap pixels to destination (includes source and destination rectangles) |
| pfnStretch | Points to bitmap stretching function (source pixels to destination) |
| StretchX | Integer stretching factor for horizontal pixels |
| pbCompressed | Pointer to current destination pixel array (compressed) |
| cbCompressedMax | Maximum byte count in pbCompressed |
| cbCompressed | Current byte count in pbCompressed |
| nLines | Destination line count for the bitmap |
| LastLine | Last vertical line (absolute) |
| MacroDstLine | Current row macro vertical position |
| MacroID | Unique identifier for current row macro |
| MacroXX | Horizontal span for current row macro |
| Bits | Pointer to pixel array |

For example, Microsoft's Internet Explorer (Version 6) prepares each bitmap or photo at the screen dots-per-inch (DPI), which is typically 96. 96×96 dpi bitmaps are sent during printing, which for 600 DPI printing requires a greater than 6× stretch in each of the horizontal and vertical page directions. By storing just the source bitmaps, the storage required is less than 1/36 as great as storing destination (600× 600 DPI) bitmap pixels.

At least some segments, in an embodiment, are stored with a 16-byte base structure, as shown below in TABLE 3.

TABLE 3

Segment Structure (base)

| Segment Member | Size (in bytes) | Description |
| --- | --- | --- |
| X1 | 2 | Starting X position |
| X2 | 2 | Ending X position |
| Type | 1 | Type (e.g. color, pattern, bitmap, etc.) |
| Raster-op | 1 | Logical drawing operator |
| Object Type | 1 | Page Element class |
| Palette Index | 1 | (if needed) |

TABLE 3-continued

Segment Structure (base)

| Segment Member | Size (in bytes) | Description |
| --- | --- | --- |
| pRight | 4 | Pointer to immediate right neighbor segment |
| Union { Color, pExtra } | 4 | Direct Color, or pointer to Extra information |

To enhance further the overall efficiency of the storage and processing of Segments from Page Elements, numerous segment Types are used. These types are shown in TABLE 4 below:

TABLE 4

Segment Types

| Segment Type | Description | Color or Extra Pointer | Extra Data (Location) |
| --- | --- | --- | --- |
| 1 | Color | Color | None |
| 2 | Pattern | -> Pattern Extra Block | Pattern in Object |
| 3 | Pattern Extended | -> Pattern Extra Block | Pattern in Extra Block |
| 4 | Bitmap | -> Bitmap Extra Block | Uncompressed bitmap data in Extra Block |
| 5 | Source Bitmap | -> Bitmap Extra Block | Source bitmap in Object |
| 6 | Compressed Bitmap | -> Bitmap Extra Block | Compressed bitmap data in Extra Block |
| 7 | Unused | | |
| 8 | Palette Color | -> Palette | Page Palette |
| 9 | Palette Pattern | -> Pattern Extra Block | Pattern in Object |
| 10 | Palette Pattern Extended | -> Pattern Extra Block | Pattern in Extra Block |
| 11 | Palette Bitmap | -> Bitmap Extra Block | Bitmap (palette indices) in Extra Block |

For example, the simplest segment is the Color segment, which occupies just 16 bytes in the current embodiment. It has just one key attribute: its Color. Its compression value should be obvious: for x1=0 and x2=3999, the Color value of 4,000 32-bit pixels is stored in this 16-byte segment, a compression ratio of 16000:16 (1000:1).

See TABLE 5 below for the extra structure members stored for Pattern Segment types. A pattern segment carries (via PatternExtra) either its own unique pattern, or a pointer to a pattern row in an Object. For example, an alternating pattern of red and green pixels (a PatternWidth of 2) can be defined, with the segment (x1,x2) indicating the overall span of the pattern for the segment. Continuing the example, with a pattern width of 2 and x1=100 and x2=219, then the pattern, when drawn, would be replicated 60 times, starting at destination pixel 100. The starting pattern alignment is handled by (x1 modulo PatternWidth). The storage cost for a pattern segment varies with the PatternWidth. For example, with a PatternWidth of 4 (with 4-byte color values), the pattern itself consumes 16 bytes, along with the root segment (16 bytes), and the PatternExtra structure (16 bytes), the total is 48 bytes. The Pattern segment in this example becomes cost-effective when the span is greater than 12 pixels. A 120 pixel span in raw raster terms takes (120×4) 480 bytes, so the equivalent Pattern segment achieves the same representation with a 10:1 compression ratio.

TABLE 5

Pattern Extra Structure

| PatternExtra Member | Description |
|---|---|
| Shift | Left shift count (pixels -> bytes) for Pattern Row pixel size |
| Pattern Width | Width of the pattern in pixels |
| cbCompressed | If compressed, byte count of compressed pattern row |
| Union { pPalette, pObject } | If pixels are palette indices, then points to Palette; if not Pattern Extended, pObject has pattern |
| pPatternRow | Points to pixel array defining the pattern |

Bitmap segments have extra data that carry the pixel arrays for the bitmap. These are one of four types: (1) bitmap for direct destination raster pixel arrays, (2) source bitmap segments that link to the original source bitmap pixels in the Page Element (Object), (3) compressed segments which are similar to bitmap segments but have their pixel arrays compressed, and (4) palette bitmaps whose pixel arrays are palette indices instead of full direct colors. TABLE 6 below shows the BitmapExtra structure members.

TABLE 6

Bitmap Extra Structure

| BitmapExtra Member | Description |
|---|---|
| X0 | X position for offset 0 in pixel array |
| DestLine | Destination vertical line (relative to top as line zero) |
| Color | Source color (for ternary rop) |
| pObject | Pointer to Bitmap Object |
| pPalette | Pointer to Palette (if PaletteBitmap) |
| Shift | Shift left count (pixels -> bytes) for pixel array (pBits) |
| cPixels | Pixel count in pBits |
| cbBits | Byte count in pBits |
| pBits | Pointer to pixel array |

The current embodiment storage cost for a Bitmap segment is 16 bytes (root) and 32 bytes (Bitmap extra). For a Source bitmap segment there is no additional cost because the source pixel arrays are stored in the Bitmap Object. For typical pages (e.g., HTML pages from the World Wide Web) the photos and bitmaps are typically low-resolution in order to speed the download times. The originating programs send instructions to stretch the lower resolution images to an area on the page. These source images are typically on the order of 100 dpi (dots per inch). Storage of the source pixels arrays in this case, compared to a final destination raster resolution of 600 dpi, is 1/36 the storage (100×100)/(600×600), a compression ratio of 36:1.

In order to avoid storing direct uncompressed pixel arrays of full destination resolution, compression techniques are applied. If the resulting compressed byte stream consumes less storage, a Compressed Bitmap segment is created instead of a raw Bitmap segment. The compression method of course can be anything suitable; in the current embodiment a simple PackBits style method is used to compress runs of consecutive identical pixels, while storing the straight pixel arrays where no runs are found.

Additional segment types use color palettes to further reduce storage and processing. A Palette Color segment, for example, has its color defined by Index (8-bit in the current embodiment), with the 256-color palette referenced by the Extra pointer. While this particular segment type does not save any memory (it is also 16 bytes), back-end color processing (color correction, etc.) can greatly benefit by color processing the palette just once, and then redundant colors on the page need not be color processed. Additionally, for Palette Pattern and Palette Bitmap segments, the color pixel arrays are stored, in the current embodiment, as 8-bit bytes instead of 32-bit full color pixels, thus providing a 4:1 storage improvement for large patterns and bitmaps.

Figure 3:
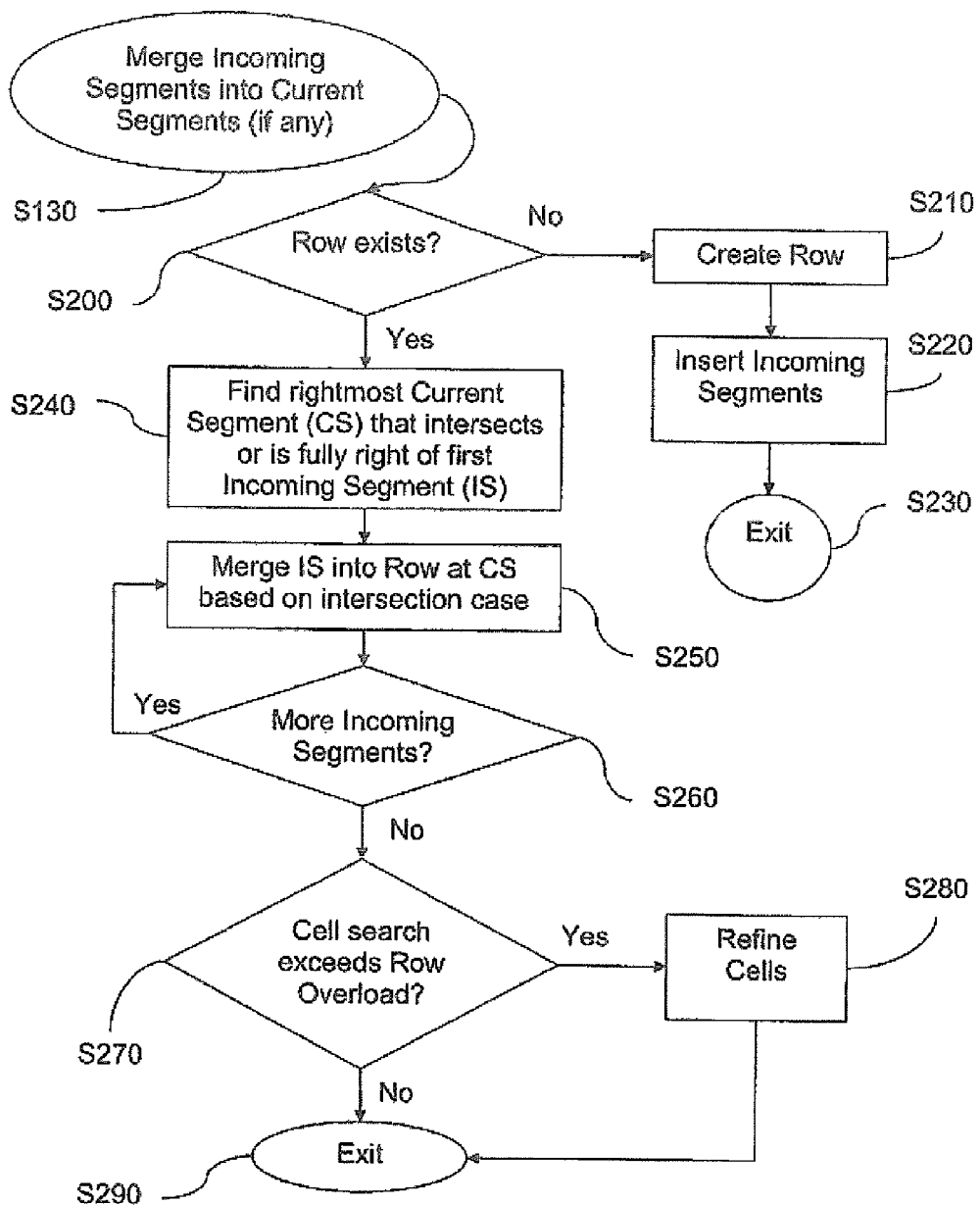
FIG. 3 shows a flowchart of the method to merge one or more Incoming Segments into Current Segments (if any), according to an embodiment of the invention.

FIG. 3 shows the expansion of step S130, which merges Incoming Segments into a row. Because the page representation starts empty, a row may not yet exist (S200). If not, then a row structure (see TABLE 7 below) is created in step S210 that serves as the root for a linked-list of segments, and indexing cells (if any). Of course if the row did not exist, then there are no underlying Current Segments, so the Incoming Segments are simply inserted (S220) into the row, preserving their left-to-right order. Processing continues on the next row (S230 returns to S140).

TABLE 7

Row Structure

| Row Member | Description |
|---|---|
| Shift | Left shift count (pixels -> cells) to index cell array |
| CellOverload | Threshold for cell refinement |
| cCells | Count of cells attached to this row |
| Bits | Status bits |
| pLeftmostSegment | Pointer to leftmost Segment on this row |
| pRightmostSegment | Pointer to rightmost Segment on this row |
| pXlate2Cell | Pointer to translation array to index cells |
| pCell | Pointer to cells (if any) attached to this row |

If the row exists, then there are Current Segments. The Incoming Segments will be added to the row, and in one embodiment are added or merged to preserve the left-to-right order of the segments on the row. Therefore, in step S240 the method finds where to start. Any Current Segments entirely to the left of the first Incoming Segment are irrelevant, as they will be undisturbed. So, the procedure finds the leftmost Current Segment that intersects or is fully right of the first Incoming Segment.

If there is no intersection, the Incoming Segment is inserted and Step S250 is repeated while there are more Incoming Segments (S260).

If there is an intersection, a more complex merge procedure is performed. For example, suppose there are two Current Segments at (100,200) and (300,400), and the Incoming Segment is at (250,350). The first Current Segment is too far left, but the second actually intersects, and that is where the merging procedure begins.

At step S250, each intersection case often involves one or more operations to fully merge the Incoming Segments and keep the non-overlapping row order intact. These segment operations include: shrink, copy, delete, and insert.

Continuing the example above, the Incoming Segment (250,350) is inserted after the (100,200) segment and before the (300,400) segment, which shrinks to what is still visible (351, 400).

Step S250 is repeated while there are more Incoming Segments (S260).

Finally, after the Incoming Segments are merged, it may be necessary to refine the cell structures that enable efficient search. If the number of searches is deemed to be excessive (more on this later), then a cell refinement process (S280) is done.

Figure 4:
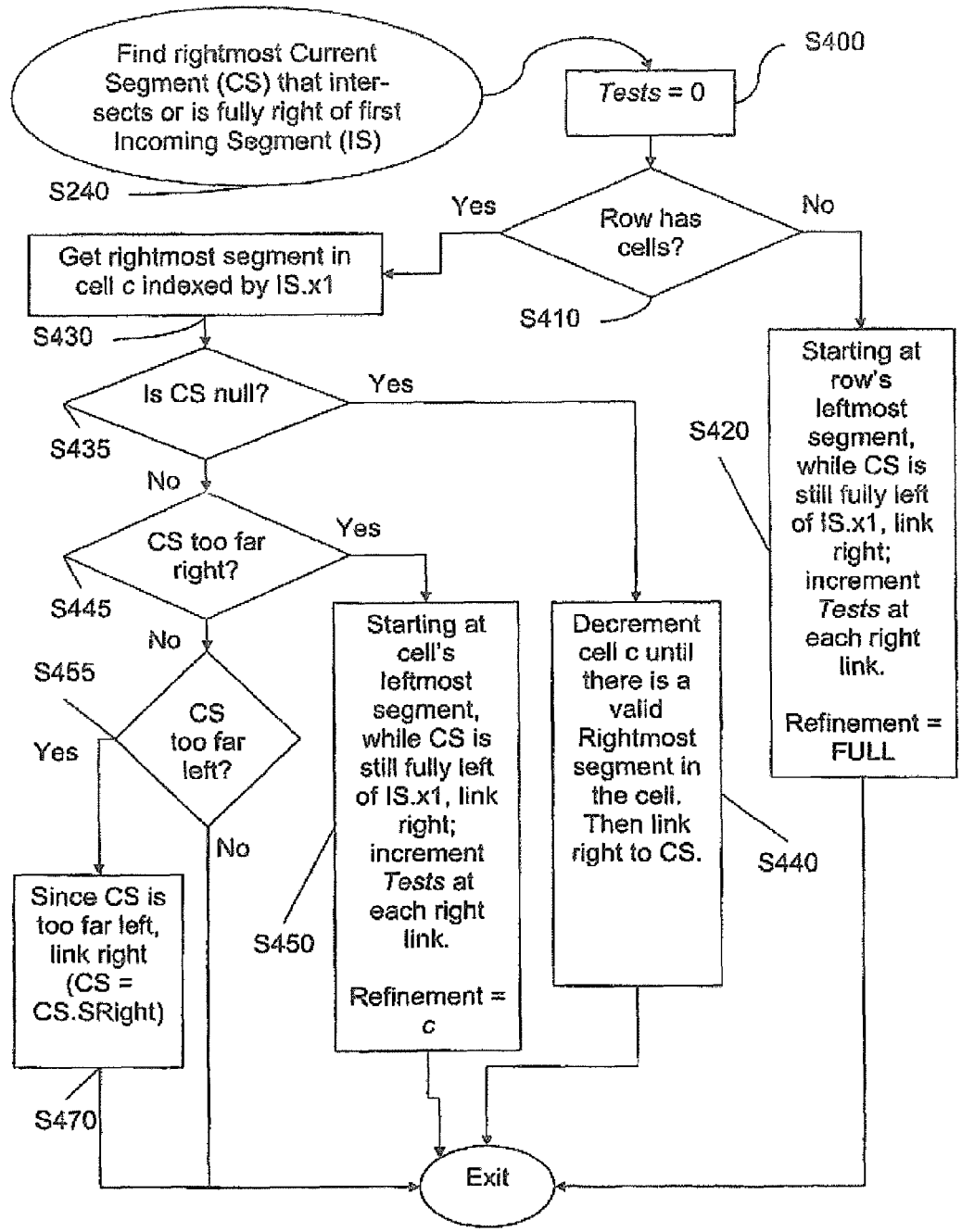
FIG. 4 shows a flowchart of the method to determine the Current Segment on a row at which the Incoming Segments are merged, according to an embodiment of the invention.

FIG. 4 shows the process of step S240 in detail. There are two main cases. First, if the row is relatively simple (there are no cell indexes), then a sequential search is made to find the target Current Segment. Second, if the row has become more complex with a large number of segments, then there may be cell index structures available to start the search close to the target, thus involving a small number of comparisons of the relative segment positions.

The count of the comparisons (a measure of compute-time performance expense) is important to adapt the cell structures to the complexity of the row. This variable Tests is initialized to zero at the beginning of the Merge process (S400). After all the Incoming Segments are merged, Tests is used (S270) to either refine the cell structures for the entire row (FULL refinement), or for a single cell c. This is described as the Refinement mode: either FULL or single cell c.

If the row has no cells (S4lO), then a search begins at the row's leftmost segment (S420), and continues until the Current Segment's right point (x2) is greater than or equal to the left point (x1) of the Incoming Segment (CS.x2>=IS.x1). Otherwise (CS.x2<IS.x1) the Current Segment is obviously fully left of the Incoming Segment. Each comparison increments Tests. The Refinement mode is set to FULL since there are no cells yet.

If the row has cells (S4IO), then we can jump to the vicinity in the row based on the left point (x 1) of the first Incoming Segment (S430). Each cell has its starting point (leftmost point in the cell), and both a pointer to the leftmost and rightmost segments in the cell. TABLE 8 below shows the cell structure members:

TABLE 8

Cell Structure

| Cell Member | Description |
| --- | --- |
| OffsetX | Left edge of cell |
| pLeftmostSegment | Pointer to leftmost Segment in Cell |
| pRightmostSegment | Pointer to rightmost Segment in Cell |

In the current embodiment, the cells do not have to be the same width. The Refinement process produces a wide cell where there are few segments, and increasingly narrow cells in areas of greater segment density. This keeps the comparison count very low, and therefore very fast.

The width of a cell can be determined by subtracting the cell's left offset from the left offset of the adjacent cell to the right.

The actual indexing procedure, in the current embodiment, involves setting a cell granularity during page setup. For example, a granularity of 64 sets the minimum cell width to be approximately 1/64 of the overall page width. In this example, on a page 8,192 pixels wide, the minimum cell width would be 128 (8192/64). This also implies a maximum 64 cells per row.

An additional CellOverload parameter, in the current embodiment, controls the refinement process. In order to keep the number of cells per row low (thereby saving memory) a cell is made as wide as possible such that the number of segments in the cell does not exceed the CellOverload parameter.

Continuing the example, assuming the CellOverload parameter is 8, suppose the row has only 4 segments whose right point (x2) is less than 1,024, but dozens of segments between 1,024 and 1,151. The first cell (cell index 0) would span (0,1023) with just 4 segments, and the second minimum-width cell (cell index 1) would span (1024,1151) with the dozens of segments.

To support this variable-width cell array, the actual indexing, based on the Incoming Segment's left point (IS.x1), is done through a byte-array (pXlate2Cell) of granularity width. Continuing the example, since the first cell spans 8 granular units, then the first 8 elements in pXlate2Cell have a cell index of 0. The 9th byte would be 1 for cell 1 (the 2nd cell).

It should now be clear that this method allows very fast direct indexing of variable-width cells, jump-starting the search process very close to the eventual intersecting Current Segment. Experimental observation has shown this technique to involve fewer comparisons even than a binary search.

Once the cell is indexed and we have its index number c, the segment of interest is the rightmost in the cell (S430).

However, it is possible that the cell exists but that no segments are currently present (they may have been deleted). If in step S435 the rightmost segment (CS) is null, then since we prefer to start as close as possible to the target (IS.x1), then in step S440 we decrement the cell index c until a rightmost cell segment is non-null. Since that segment is obviously fully left of IS.x1, the right link of that segment is the final target Current Segment.

If in step S435 the cell's rightmost segment is non-null, then we start with that segment (CS) and further analyze its position.

Since IS.x1 may be anywhere within the cell, and CS is the rightmost segment in the cell, it is possible that CS is too far right (S445). If so, in step S450 we start at the cell's leftmost segment to find the first intersecting (or fully right) segment. Again we increment Tests at each comparison. The Refinement mode is set for the single cell c to be refined.

It is also possible that CS is too far left (S455). For example, if the cell spans (0,1023) and the first and only segment spans (100,200) and the Incoming Segment spans (500,600), then the cell's current rightmost segment is too far left. This case is easily handled (S470) by linking right of CS. Since that segment must be in a cell to the right, it is guaranteed to either intersect or be fully right of IS.x1.

If CS is neither too far right (S445) nor too far left (S455), then it intersects the Incoming Segment, and we are ready to begin the merging process.

Traversal structure is employed for tracking the current segment (for the insertion point and intersection evaluation), the current cell, and for the convenience of tracking the previous segment. The current embodiment employs just a right-threaded linked segment list to save storage space. See TABLE 9 below Traversal structure members:

TABLE 9

Traversal Structure

| Traverse Member | Description |
| --- | --- |
| pRow | Pointer to row being traversed |
| pLeftSegment | Pointer to segment to the left of Segment (below) |
| pSegment | Pointer to current Segment |
| C | Cell index |

Based on simple one-dimensional intersections, there are a handful of possible cases for the intersection of IS and CS. These are shown in TABLE 10 below.

TABLE 10

Merge Segment Intersection Cases and Operations
(In the table below, segment A is the Current Segment, segment B in the Incoming Segment, Segment C is a newly synthesized segment from a raster-op, and the Next segment will be the Current Segment in the next merge.)

| Merge Segment Intersection Case | Opaque Operations | Opaque Examples | Raster-op Operations | Raster-op Example |
|---|---|---|---|---|
| Left fragment | Shrink A; Delete all under B; Insert B; Next = B -> Right; | AAAABBBBBBBBBB | Insert B; Next = B -> Right; | AAAACCCC BBBBBB |
| Right fragment | Shrink A; Insert B; Next = A; | BBBBBBBBBB AAAAAAAAAA BBBBBBBBBBAAAA | Shrink A; Insert B; Insert C = (B rop A); Shrink A'; Insert A'; Next = A'; | BBBBBBBB BB AAAAAAA AAA BBBBCCCC CAAAA |
| Left and Right Fragment | Copy A to A'; Shrink A; Insert B; Shrink A'; Insert A'; Next = A; | BBBBB AAAAAAAAAAAAA A AAAABBBBAAAA A | Copy A to A'; Shrink A; Insert C = (B rop A); Shrink A'; Insert A'; Next A; | BBBBB AAAAAAA AAAAAAA AAAACCCC CAAAAA |
| Invisible | Delete A; Delete all under B; Insert B; Next = B -> Right; | BBBBBBBBBB AAAA BBBBBBBBBB | Copy B to B'; Shrink B; Insert C = (B rop A); Shrink B'; Insert B'; Next = B' -> Right; | BBBBBBBB BB AAAA BBBCCCCB BB |
| Nothing below | Insert B; Next = B -> Right; | BBBBBBBBBB BBBBBBBBBB | Insert C = (B rop Background color); Next = C -> Right; | BBBBBBBB BB *Background* CCCCCCCC CC |

At step S250, each intersection case requires one or more operations to fully merge the Incoming Segments and keep the non-overlapping row order intact. These operations include:

Shrink: takes a segment and shrinks its position (x1,x2) on the row by either increasing x1 or decreasing x2. For example, in the Left Fragment case, the intersecting Current Segment (CS) must shrink such that its new x2 value is decreased to (IS.x1−1).

Copy: takes a segment and copies its attributes while assigning a new position (x1,x2). For example, in the Left And Right Fragment case, the Current Segment A in effect splits into two pieces: the first can be achieved just by shrinking the original segment (as in the Left Fragment case). However, the right piece is copied from the first, and its new position assigned (IS.x2+1, CS.x2).

Delete: removes a segment from the Row links and from memory. For example, in the Invisible case, the Incoming Segment B entirely overlaps the Current Segment A. In the normal opaque drawing model, this means that A is no longer visible, so it may be deleted. It is as if it never existed.

Insert: adds a segment to the Row links; by traversal convention the new segment is inserted after the Current Segment (TRAVERSE.pSegment).

A few notes on the Raster-op drawing model: while the current embodiment employs the 256 "ternary" rop model of Microsoft Windows, the operations could involve any logical combination (or function) of the pixel values in CS A and IS B. For example, an XOR (exclusive-or) raster-op would take the A color XOR the B color, with the resulting color being assigned to new segment C.

See also TABLE 13 for a matrix of different segment type combinations that illustrates the efficient handling of raster-ops while preserving, where possible, the inherent compression of the segment types.

Another Page Element attribute that requires special handling for the intersection of current and incoming segments is Opacity. Normally the incoming Page Element by default has Opacity 100%, meaning everything below is obscured. However, with Opacity 50%, for example, the colors below are averaged with the incoming colors. In general, with Opacity level of O, then the Destination colors (D) are computed with the Source colors (S) as follows: $S*(O/100)+D*((100-O)/100)$. Even more complex combinations are possible, but it should be apparent that Opacity can be handled in an efficient manner, similar to the Raster-op handling described below.

The various copy, shrink, delete, and insert operations adjust the linked list of segments, preserving the left-to-right ordering.

Since the shrink, delete, and insert merge operations may alter the current leftmost and rightmost segments in a cell, corrections to the cells often need to be made, as shown below in TABLE 11.

TABLE 11

Cell Corrections during Merge Operations

| Merge Operation | Possible Cell Corrections |
|---|---|
| Shrink | If the shrinking segment changes its cell, a correction is typically performed. Since the cell index is based on x2 (rightmost segment point), in this example, any cell change is leftward. If the segment was already the rightmost segment, the cell is vacated (no segments) and the segment becomes the rightmost in the new cell. If the segment was the leftmost, then if the next segment to the right is within the old cell, that right segment is now leftmost, otherwise the cell is vacated. |

TABLE 11-continued

Cell Corrections during Merge Operations

| Merge Operation | Possible Cell Corrections |
|---|---|
| Delete | If the segment was already the rightmost segment, then if the segment to the left is in the cell, it becomes rightmost, otherwise the cell is vacated (empty). If the segment was the leftmost, then if the segment to the right is within the old cell, the right link is now leftmost, otherwise the cell is vacated. |
| Insert | Compare the newly inserted segment against current Leftmost and Rightmost segments in cell, and change cell segment pointers if necessary. |

Once an Incoming Segment IS merged, if there are more Incoming Segments (S260) we return to S250.

If there are no more Incoming Segments, then the Tests variable is compared to the row's CellOverload parameter (8270). If there has been excessive testing, then the cells may need to be refined further (S280).

Figure 5:
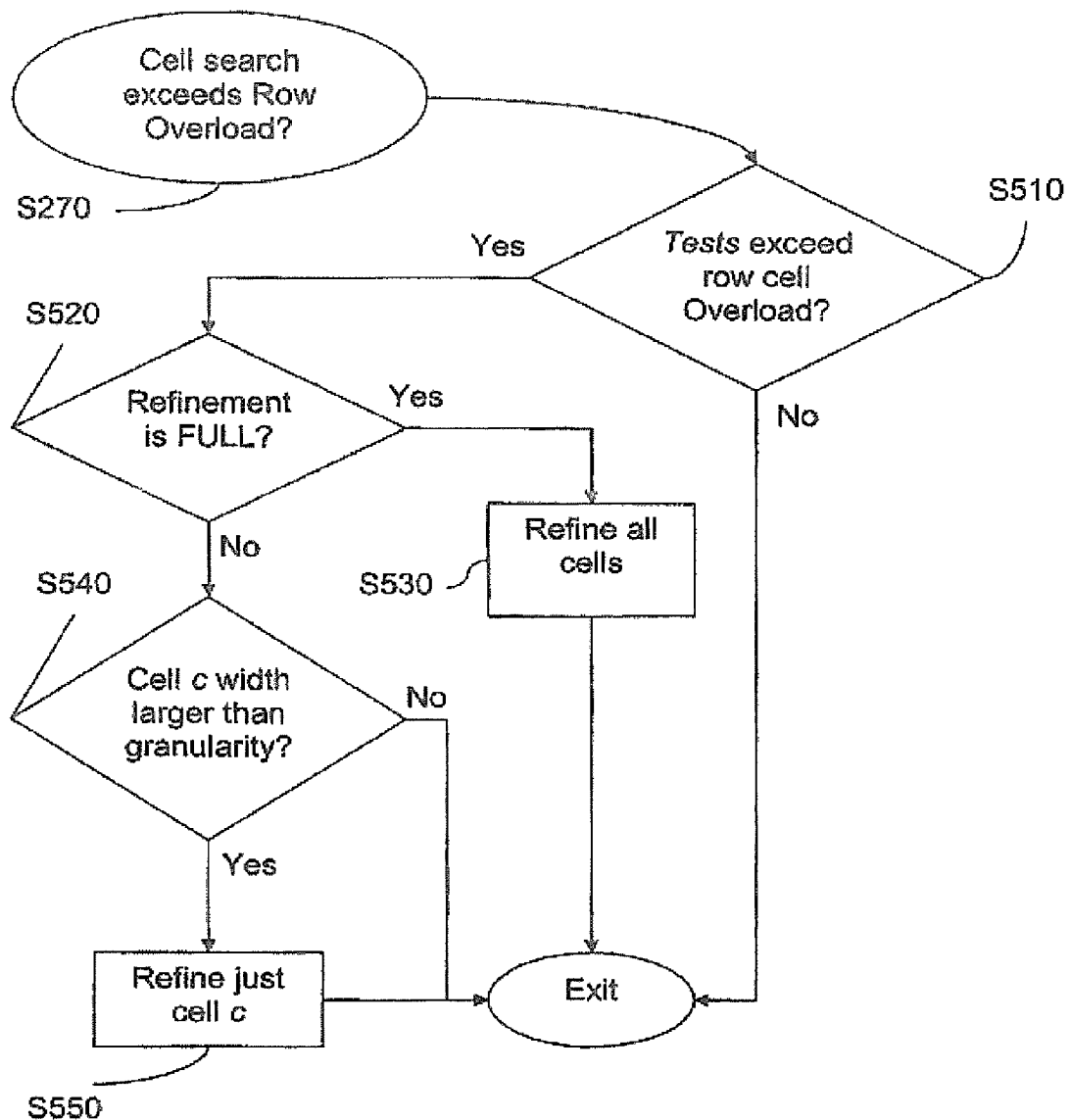
FIG. 5 shows a flowchart to determine whether or not to Refine all cells, a single cell, or none, according to an embodiment of the invention.

FIG. 5 shows this evaluation in more detail. If Tests exceeds the CellOverload (S510), and if the Refinement Mode is FULL (S520), then in this example, all cells are refined (S530), thus creating narrower cells with fewer segments per cell.

If the Refinement mode is just a single cell c, then it is possible that the cell is already as narrow as can be, based on the cell granularity. Nothing further is done in this case.

However, if the cell c width is larger than the granularity, there is room for improvement, and the refinement process (S550) attacks cell c.

Figure 6:
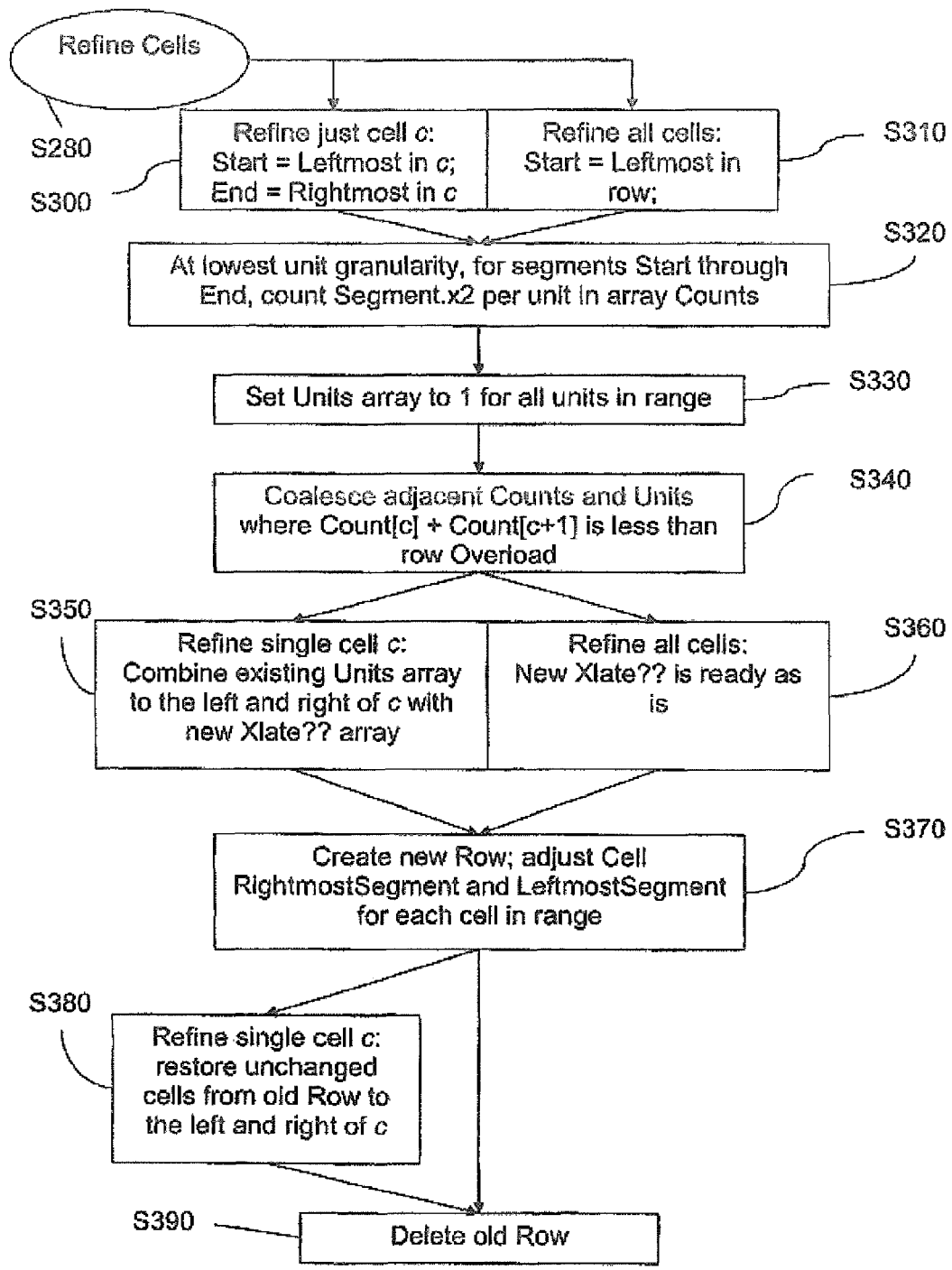
FIG. 6 shows a flowchart illustrating the method of cell refinement, according to an embodiment of the invention.

FIG. 6 shows the cell refinement process both for multiple cells and for just a single cell c.

The overall process scans either a cell or a row, and in one embodiment produces the minimum number of cells in that span that either (a) do not have too many segments (based on CellOverload), or (b) are already the minimum cell width.

The segment range to consider is either the entire row (S310), or the leftmost and rightmost segments in the cell c (S300). An array Counts is initialized to zero, with the width of Counts equal to the maximum number of cells in the span.

At step S320, for each segment in the range, the segment.x2 value is indexed (right shifted based on granularity) to Counts, which is incremented. After the segments are considered, the array Counts now has the count of the segments in each of minimum width (granularity) cells.

At step S330, a unit array (Units) is set to 1 for all possible cells in the span. The Units array indicates the number of granular units in the cell.

At step S340, all granular cells are considered, and from left to right the cells are coalesced if the total segments in two adjacent cells remain less than CellOverload. This process repeats recursively until no cells can be further coalesced. At the end, we now have the number of cells in the span, the array Counts has the segments per cell, and the Units array has the number of granular cell units per cell.

At step S350, for single cell c, the cell information to the left and right of cell c are combined with the new results for c.

At step S360, for the full row refinement, the full row cell count and Units per cell are ready for a new row creation.

At step S370, a new row is created, and for each cell in the range (either full row or cell c) the Rightmost and Leftmost segment pointers are set.

At step S380, the cell structures to the left and right of cell c are copied into the new row.

At step S390, the old row is deleted, and the new row added to the page.

Returning to the complex problem of handling raster-ops without resorting to rasterization, TABLE 13 shows that special handling for many of the segment combinations (IS is Incoming Segment, CS is Current Segment) means that overall compression and efficiency can often be preserved.

When a complex (non-opaque model) raster-op is performed, the multitude of segment types are first converted to a subset for easier resolution. TABLE 12 shows the conversions by segment type.

TABLE 12

Segment Conversions prior to Raster-op Resolution

| Extended Segment Type | Segment Type for Raster-op Resolution |
|---|---|
| Color | Color |
| Pattern | Pattern Extended |
| Pattern Extended | Pattern Extended |
| Bitmap | Bitmap |
| Source Bitmap | Compressed Bitmap |
| Compressed Bitmap | Compressed Bitmap |
| Palette Color | Color |
| Palette Pattern | Pattern Extended |
| Palette Pattern Extended | Pattern Extended |
| Palette Bitmap | Bitmap |

An empty cell in TABLE 13 implies that no special handling is implemented in the current embodiment, and conventional rasterization with raster-ops is performed with the result stored as a Bitmap segment.

Note: the Compressed Bitmap segment type is abbreviated in TABLE 13 as "CBits". "Anything" refers to any segment type. "PatternX" refers to a Pattern Extended segment.

TABLE 13

Raster Op Handling by Segment Types

| Current Segment (CS) | IS Color | IS Pattern Extended | IS Bitmap | IS Compressed Bitmap |
|---|---|---|---|---|
| Color | New Color = (IS.Color rop CS.Color) | New PatternX = (IS.PatternX rop CS.Color) | New Bitmap = (IS.Bitmap rop CS.Color) | Enumerate compressed segment; recompress New CBits = (IS.CBits rop CS.Color) |
| PatternX | New PatternX = (IS.Color rop CS.PatternX) | New PatternX = (IS.PatternX rop CS.PatternX if PatternWidths are equal | | Enumerate compressed segment; recompress New CBits = (IS.CBits rop CS.Pattern) |
| Bitmap | New Bitmap = (IS.Color rop CS.Bitmap) | | | |
| Compressed Segments | Enumerate compressed segment; recompress New CBits = (IS.Color rop CS.CBits) | Enumerate compressed segment; recompress New CBits = (IS.PatternX rop CS.CBits) | | |
| Any Segment Type | | | New Bitmap = (IS.Anything rop CS.Bitmap) | |

Returning to FIG. 1, step S30 is invoked when no more Page Elements arrive, that is, the page description is complete. Unlike a conventional raster system in which the raw pixels are compressed into a final 2D raster output target format (for example, JPEG (ITU T.81) or JBIG (1TU T.82)), the current embodiment translates the compressed segments into a stream such that the inherent compression is preserved. For example, on a given line a solid color segment from x1 to x2 generates a run-length encoding equivalent to (x2−x1+1) followed by the segment color.

For each row in the page, the segments are translated into stream form and sent along for further processing. That processing could include further image-processing, and the stream could be sent directly to an embedded controller in a printer.

In the current embodiment, Step S30 can alternatively pass control to a lower-level driver that requests, via random access to any row, an enumeration of that line's segments to process, draw, send, translate, etc.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method, comprising:
storing a plurality of segments, wherein each of the segments includes a first drawing command to render a scanline on a rendering device, and wherein the segments are non-overlapping;
receiving a page element, wherein the page element includes a second drawing command to render a page on the rendering device, and wherein the page element includes a first segment; and
merging the first segment into the plurality of segments, wherein merging the first segment into the plurality of segments includes selectively shrinking one of the plurality of segments.

2. The method of claim 1, wherein:
the one of the plurality of segments has (i) a first position on the scanline and (ii) a second position on the scanline; and
shrinking the one of the plurality of segments includes at least one of
increasing the first position of the one of the plurality of segments on the scanline, and
decreasing the second position of the one of the plurality of segments on the scanline.

3. The method of claim 1, further comprising:
generating a shrunk segment by shrinking the one of the plurality of segments; and
inserting the first segment adjacent to the shrunk segment on the scanline.

4. The method of claim 1, further comprising shrinking the one of the plurality of segments in response to the first segment intersecting the one of the plurality of segments along the scanline.

5. The method of claim 1, further comprising merging the first segment into the plurality of segments by:
inserting the first segment into the plurality of segments in response to the first segment not intersecting the one of the plurality of segments along the scanline.

6. The method of claim 1, further comprising merging the first segment into the plurality of segments by:
deleting the one of the plurality of segments in response to the first segment entirely overlapping the one of the plurality of segments.

7. The method of claim 1, further comprising merging the first segment into the plurality of segments by:
splitting the one of the plurality of segments into a second segment and a third segment; and
generating at least one of a first shrunk segment and a second shrunk segment by shrinking at least one of the second segment and the third segment.

8. The method of claim 7, further comprising, in response to the first segment intersecting the one of the plurality of segments along the scanline, inserting the first segment:
between the second segment and the second shrunk segment, or
between the first shrunk segment and the third segment, or
between the first shrunk segment and the second shrunk segment.

9. The method of claim 1, further comprising:
dividing the scanline into cells, wherein each of the cells is a data structure representing an area having a variable width; and
changing a width of one of the cells based on a total number of segments in the scanline.

10. The method of claim 1, further comprising:
dividing the scanline into cells, wherein each of the cells is a data structure representing an area having a variable width; and
adjusting a width of the cells to include a predetermined number of segments in each of the cells.

11. An apparatus, comprising:
a memory configured to store a plurality of segments, wherein each of the segments includes a first drawing command to render a scanline on a rendering device, and wherein the segments are non-overlapping; and
a processor configured to
receive a page element, wherein the page element includes a second drawing command to render a page on the rendering device, and wherein the page element includes a first segment, and
merge the first segment into the plurality of segments, wherein merging the first segment into the plurality of segments includes selectively shrinking one of the plurality of segments.

12. The apparatus of claim 11, wherein:
the one of the plurality of segments has (i) a first position on the scanline and (ii) a second position on the scanline; and
the processor is configured to shrink the one of the plurality of segments by at least one of
increasing the first position of the one of the plurality of segments on the scanline, and
decreasing the second position of the one of the plurality of segments on the scanline.

13. The apparatus of claim 11, wherein the processor is configured to:
generating a shrunk segment by shrinking the one of the plurality of segments; and
inserting the first segment adjacent to the shrunk segment on the scanline.

14. The apparatus of claim 11, wherein the processor is configured to shrink the one of the plurality of segments in response to the first segment intersecting the one of the plurality of segments along the scanline.

15. The apparatus of claim 11, wherein the processor is configured to merge the first segment into the plurality of segments by:

inserting the first segment into the plurality of segments in response to the first segment not intersecting the one of the plurality of segments along the scanline.

16. The apparatus of claim 11, wherein the processor is configured to merge the first segment into the plurality of segments by:
deleting the one of the plurality of segments in response to the first segment entirely overlapping the one of the plurality of segments.

17. The apparatus of claim 11, wherein the processor is configured to merge the first segment into the plurality of segments by:
splitting the one of the plurality of segments into a second segment and a third segment; and
generating at least one of a first shrunk segment and a second shrunk segment by shrinking at least one of the second segment and the third segment.

18. The apparatus of claim 17, wherein in response to the first segment intersecting the one of the plurality of segments along the scanline, the processor is configured to insert the first segment:
between the second segment and the second shrunk segment, or
between the first shrunk segment and the third segment, or
between the first shrunk segment and the second shrunk segment.

19. The apparatus of claim 11, the processor is configured to:
divide the scanline into cells, wherein each of the cells is a data structure representing an area having a variable width; and
change a width of one of the cells based on a total number of segments in the scanline.

20. The apparatus of claim 11, the processor is configured to:
divide the scanline into cells, wherein each of the cells is a data structure representing an area having a variable width; and
adjust a width of the cells to include a predetermined number of segments in each of the cells.

* * * * *